May 3, 1966     L. E. ST. JEAN     3,249,281

MULTIPLE ULTRASONIC SOLDER FOUNTAIN MACHINE

Filed Jan. 13, 1964

INVENTOR
LLOYD E. ST. JEAN

BY    *Louis Pflüger*

ATTORNEY

United States Patent Office 3,249,281
Patented May 3, 1966

3,249,281
MULTIPLE ULTRASONIC SOLDER
FOUNTAIN MACHINE
Lloyd E. St. Jean, Westbury, N.Y., assignor to Sanders Associates, Inc., Nashua, N.H., a corporation of Delaware
Filed Jan. 13, 1964, Ser. No. 337,302
8 Claims. (Cl. 228—37)

This invention relates to ultrasonic soldering, and more particularly to an ultrasonic soldering machine particularly adapted to the soldering of printed circuit boards in quantity production and arranged to facilitate rearranging the ultrasonic driving heads to permit relatively quick change of the solder fountain pattern to handle circuit boards having different circuits without requiring shutdown of the machine.

It is an object of this invention to provide an ultrasonic soldering machine having a multiplicity of ultrasonic driving heads disposed outside of, and preferably below, the solder bath, to provide the desired solder fountain pattern for a particular circuit board.

It is a further object of this invention to provide such a machine in which the solder tank or pot is provided with a bottom permeable to ultrasonic vibrations, and in which the ultrasonic driving heads abut the bottom, and are mounted on a base plate preferably removably secured to the solder pot, for quick removal of the base plate, and substitution of another, or for rearrangement of the driving heads on the base plate, when it is desired to change the circuit boards to be soldered.

It is a further object of this invention to provide for phase and amplitude control of each ultrasonic driving head, to determine the solder fountain pattern.

Still other objects and advantages of this invention will be apparent from the specification.

The features of novelty which I have believe to be characteristic of my invention are set forth with particularly in the appended claims. My invention itself, however, both as to its fundamental principles and its particular embodiments, will best be understood by reference to the specification and accompanying drawing in which FIG. 1 is a cross-sectional view of the ultrasonic machine and FIG. 2 is a bottom view of an alternative base plate providing for easy adjustment of the head assemblies.

Figure 1:
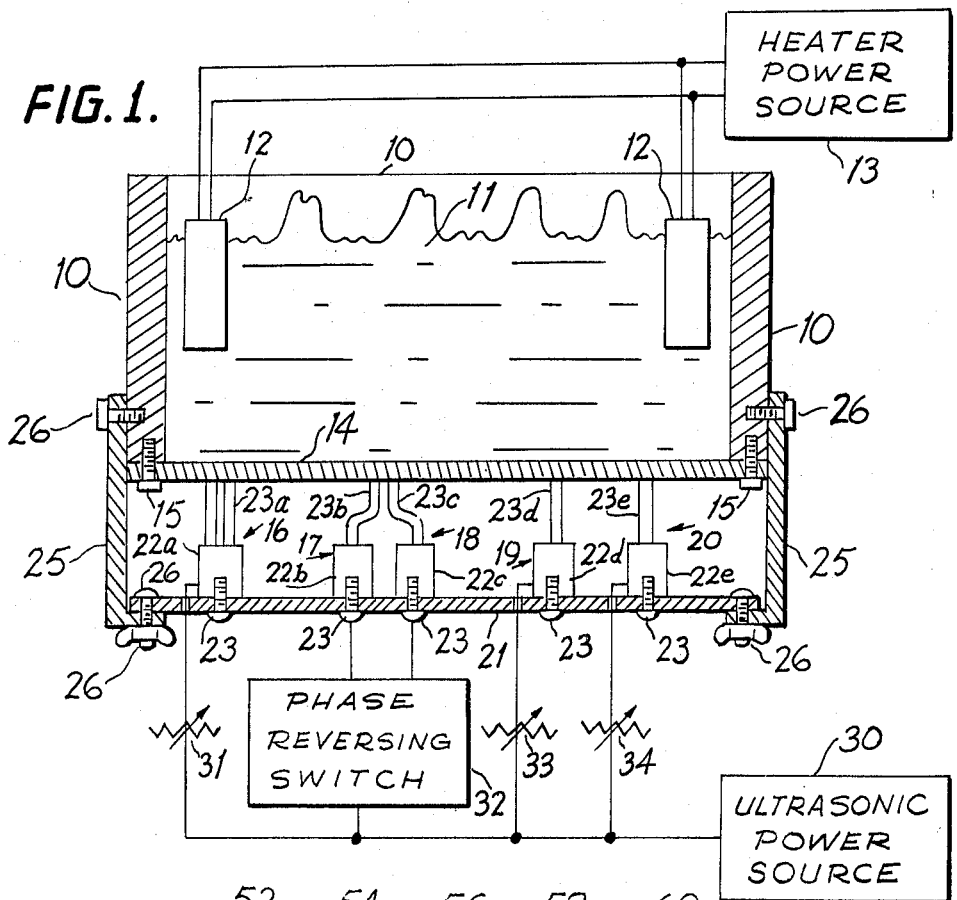
Figure 2:
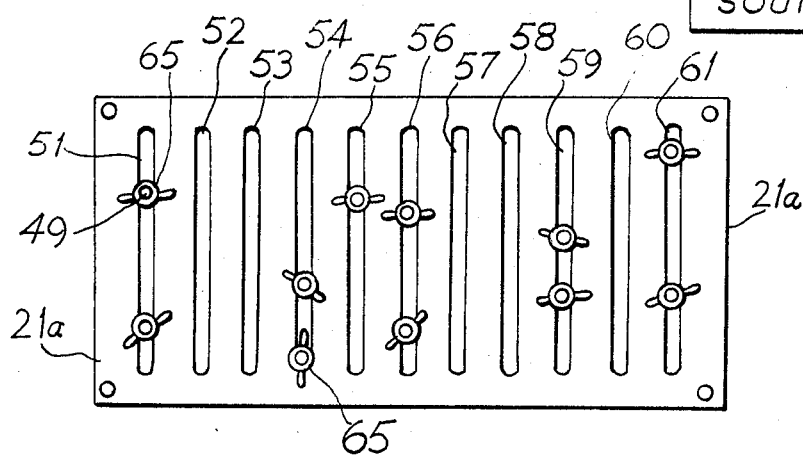

Referring now to FIG. 1, 10 represents the side and end walls of the solder tank containing solder 11, maintained at soldering temperature by any suitable means, such as immersion heaters 12, energized from a suitable electric power source 13.

The bottom of the tank is formed by sheet 14, permeable to ultrasonic vibrations, secured to the side and end walls by screws 15. The sheet may be "Teflon," "Fiberglas" laminate, thin stainless steel, or other material chosen for acoustic match and compatibility with solder. In the embodiment shown, the couplers abut against the bottom of the tank, but they may abut one or more of the vertical sides of the tank in place of, or in addition to abutting the bottom. In such case, the side wall or walls may be made of ultrasonic permeable material, as already described with reference to the tank bottom.

The driving heads 16, 17, 18, 19 and 20, of which only five are shown, are secured to removable base plate 21 in the desired position by mounting screw 23 and the upper ends of the driving heads abut against bottom sheet 14 at their upper ends. Each driving head is made up of a vibrator 22a, 22b, 22c, 22d and 22e, respectively, and a coupler 23a, 23b, 23c, 23d and 23e, respectively, driven by the vibrator and transmitting vibrations to the tank bottom 14. The base plate 21 is carried by L-shaped brackets 25, and the brackets are secured to base plate 21 and to the tank walls by any suitable means, such as bolts 26. Alternatively, instead of affixing each head assembly to a hole in the base plate 21, the base plate 21 can be arranged with elongated slots running in various directions so that the heads can be adjusted in position to produce a desired solder pattern in accordance with the work piece to be soldered. Alternatively, any suitable means for adjusting the position of the heads can be used.

Electric ultrasonic power is provided by source 30 to each vibrator through amplitude and phase controls 31, 32, 33 and 34, respectively. As shown, 32 is a phase reversing switch, while 31, 33 and 34 are amplitude controls, such as potentiometers, but it should be understood that each vibrator may have its own individual phase adjustment over 360°, and its own amplitude control.

The couplers 23a, 23b, 23c, 23d and 23e may be specifically shaped in cross-section as desired, such as circular, rectangular, hexagonal, or the like, may be bent or curved (as 23b and 23c), and may be of different cross-sectional area or sizes, particularly designed and arranged to produce the solder fountain pattern desired. The vibrator units 22a, 22b, 22c, 22d and 22e may be of any suitable type known in the art, such as magnetostrictive, but other types may be used.

FIG. 2 shows a bottom view of the base plate with slots in which the heads can be slidably moved. Although the slots are shown as running across the width of the base plate, they can be arranged in any direction, angle and length to produce a desired solder pattern. Any number of heads that will fit within the width of the base plate, such as heads 16 and 17, can be used. Instead of screws 23, the head assemblies have been provided with studs 49 and wing nuts 65.

While I have shown and described certain preferred embodiments of my invention and the best mode presently known to me for practicing the same, it will be understood that modifications and changes may be made without departing from the spirit and scope of my invention.

I claim:

1. An ultrasonic soldering machine comprising a solder tank having a bottom plate, said bottom plate being permeable to ultrasonic waves and suitable to contain molten solder, a base plate removably secured to said tank, and carrying a multiplicity of driving heads, each comprising a vibrator unit and a coupler, said couplers abutting the lower surface of said bottom plate means for mounting said driving heads on said base plate, said mounting means including means for providing selective relative positioning of said driving heads in parallel planes to establish a discrete solder fountain patterns on the surface of molten solder contained in said solder tank.

2. The combination claimed in claim 1 in which at least a plurality of said couplers have different cross-sectional shapes.

3. The combination claimed in claim 1 in which at least a plurality of said couplers have different cross-sectional areas.

4. The combination claimed in claim 1 in which at least one of said couplers is non-rectilinear.

5. The combination claimed in claim 1 with an ultrasonic power source for driving said vibrators, and means for controlling the phase feed to a plurality of said vibrators.

6. The combination claimed in claim 1 with an ultrasonic power source for driving said vibrators, and means for controlling the amplitude feed to a plurality of said vibrators.

7. The combination claimed in claim 1 with an ultrasonic power source for driving said vibrators, and means for controlling the phase and amplitude feed to a plurality of said vibrators.

8. An ultrasonic soldering machine comprising a solder tank having the bottom plate permeable to ultrasonic waves, a base plate having a plurality of slots therein removably secured to said tank, a multiplicity of ultrasonic driving heads mounted in said slots, each said driving head comprising a vibration unit and a coupler, said couplers abutting the lower surface of said bottom plate and means for varying the position of the driving heads in said slots to form a desired solder fountain pattern in molten solder contained within said solder tank.

References Cited by the Examiner

UNITED STATES PATENTS

| | | | |
|---|---|---|---|
| 2,875,261 | 2/1959 | Hanff | 259—1 |
| 2,891,176 | 6/1959 | Branson | 259—1 |
| 2,896,649 | 7/1959 | Faidley | 259—1 |
| 2,937,292 | 5/1960 | Welkowitz et al. | 259—1 |
| 2,958,332 | 11/1960 | Schueler | 259—1 |

WHITMORE A. WILTZ, *Primary Examiner.*

M. L. FAIGUS, *Examiner.*